(No Model.)
H. D. ALEXANDER.
FORK.
No. 368,503. Patented Aug. 16, 1887.
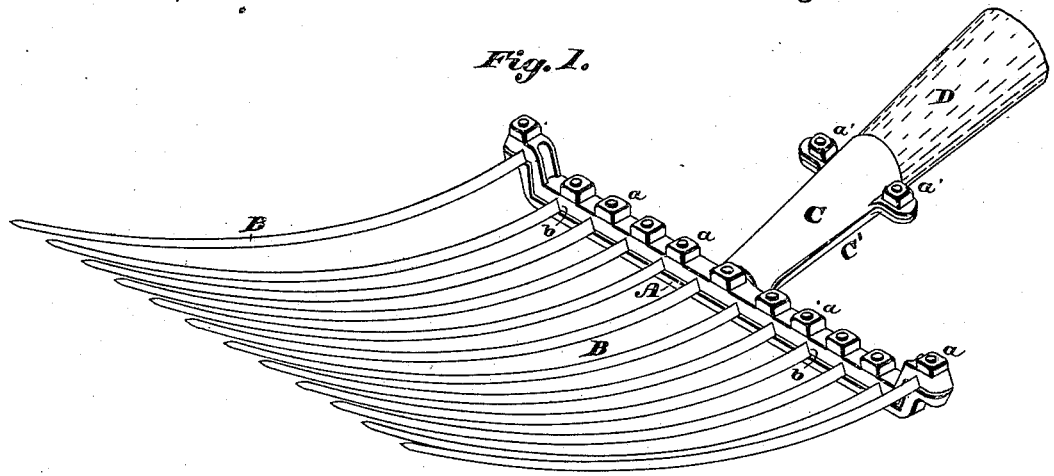
Fig. 1.
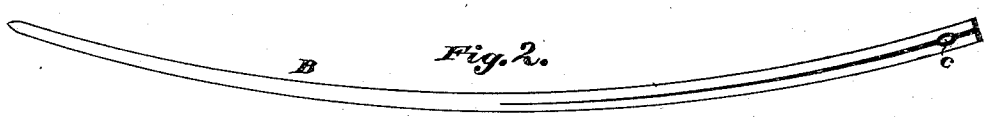
Fig. 2.
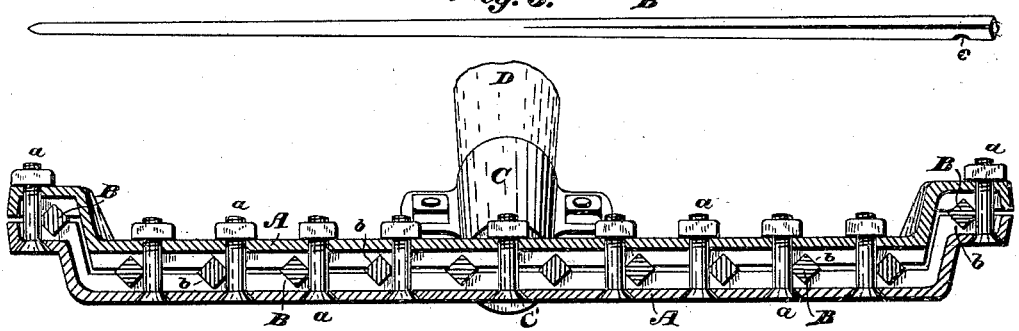
Fig. 3.
Fig. 4.
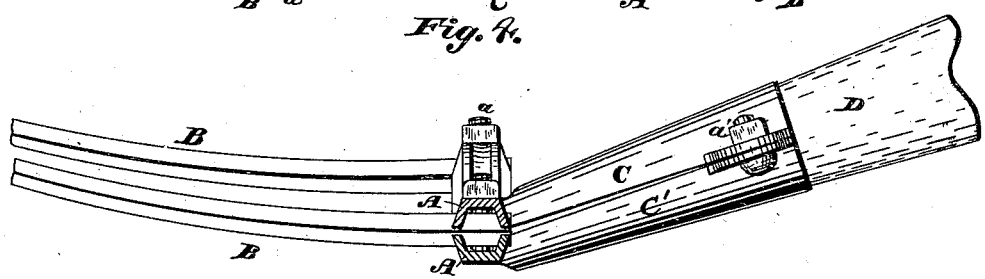
Fig. 5.
WITNESSES:
Harry Frease
Frank S. Masten
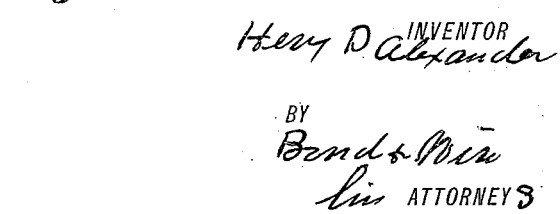
INVENTOR
Henry D. Alexander
BY
Bond & Bien
his ATTORNEYS

United States Patent Office.

HENRY D. ALEXANDER, OF CANTON, OHIO, ASSIGNOR OF ONE-HALF TO EMERY S. ECKIS, OF SAME PLACE.

FORK.

SPECIFICATION forming part of Letters Patent No. 368,503, dated August 16, 1887.

Application filed April 23, 1887. Serial No. 235,918. (No model.)

*To all whom it may concern:*

Be it known that I, HENRY D. ALEXANDER, a citizen of the United States, residing at Canton, in the county of Stark and State of Ohio, have invented certain new and useful Improvements in Forks; and I do hereby declare that the following is a full, clear, and exact description of the same, reference being had to the annexed drawings, making a part of this specification, and to the letters and figures of reference marked thereon, in which—

Figure 1 is a perspective view of the fork. Fig. 2 is a side view of a tine. Fig. 3 is a top view of a tine. Fig. 4 is a longitudinal sectional view of the head. Fig. 5 is a cross-sectional view of the head.

The present invention has relation to forks; and its nature consists in the different parts and combination of parts, hereinafter described, and particularly pointed out in the claims.

Similar letters of reference indicate corresponding parts in all the figures of the drawings.

In the accompanying drawings, A represents the fork-head, which is formed in two pieces or halves, said pieces or halves being securely attached together by means of the clamping-bolts $a$.

For the purpose of having the outside tines above the center tines the pieces or halves forming the head A are formed somewhat higher at their ends, as shown in the drawings. The pieces or halves forming the head A are each provided with the notches or recesses $b$, which are located so as to form an opening for the tines B when said halves are placed in the position shown in Fig. 4, the number of the notches to correspond with the number of tines designed to be placed in the fork proper.

The tines B may be substantially of the form shown in the drawings, and should be somewhat thicker at their rear ends than the opening is large in the head A, so that said tines will be firmly held in proper position by means of the clamping-bolts $a$. The tines B are provided with the notches $c$, which are for the purpose of engaging the clamping-bolts $a$, thereby assisting in holding the tines in proper position.

It will be seen that by my peculiar manner of attaching the tines B to the head A they can be easily detached, and in case a tine becomes broken a new one can be easily adjusted. The handle-socket is formed in two pieces or halves, C C, one piece being formed on each of the pieces or halves of the head A, said socket being securely held together by means of the clamping-bolts $a'$. The handle D is attached to the socket in any well-known manner.

Having fully described my invention, what I claim as new, and desire to secure by Letters Patent, is—

1. In combination with the head A, formed in two pieces or halves, provided with recesses $b$ and integral half-sockets C C, the clamping-bolts $a$ and the tines B, substantially as and for the purpose specified.

2. The head A, provided with the raised ends, the tines B, and the clamping-bolts $a$, substantially as and for the purpose specified.

In testimony that I claim the above I have hereunto subscribed my name in the presence of two witnesses.

HENRY D. ALEXANDER.

Witnesses:
EMRY S. ECKIS,
FRED W. BOND.